J. C. Wade.

Sewing Machine Shuttle.

No. 3,935. Reissued Apr. 26, 1870.

Witnesses,
O. E. Doolittle
R. A. Wiggin

Inventor,
James C. Wade
by his attorney B. W. Williams & Son

United States Patent Office.

JAME C. WADE, OF BOSTON, MASSACHUSETTS.

*Letters Patent No.* 93,845, *dated August* 17, 1869; *reissue No.* 3,935, *dated April* 26, 1870.

IMPROVEMENT IN SHUTTLE FOR SEWING-MACHINE.

The Schedule referred to in these Letters Patent and making part of the same

*To all whom it may concern:*

Be it known that I, JAMES C. WADE, of Boston, in the county of Suffolk and State of Massachusetts, have invented a new and useful Improvement in Shuttles; and I do hereby declare that the following is a full and exact description thereof, reference being had to the accompanying drawings and to the letters of reference marked thereon.

My invention relates primarily to sewing-machine shuttles in which the tension may be regulated from the upper side of the shuttle, while the same is lying in its race; and It consists in the employment of a tension-regulator having no endwise motion, and actuating a thread-brake against the upper wall of the shuttle, as the latter lies in the machine ready for use, such regulator being so located as to be accessible and operated from the upper side of the shuttle; and It further consists in details of construction hereinafter particularly described, which are also applicable to other classes of sewing-machine shuttles.

The same letters refer to like parts in all the figures.

A indicates the adjusting-screw or tension-regulator.

B, the tension-spring.

C, the block of metal at the tip or forward and tapering end of the shuttle, and through a part of which the unthreaded portion of the screw passes, and in which it is free to turn.

The screw A is formed with a nick in its head, by which it may be turned with an ordinary screw-driver or other proper implement.

It has also a screw-thread, extending but a short distance beyond its head, and with the remainder of its spindle or stock unthreaded, and has near its inner end an annular groove, G, into which enters the tip of the detaining-screw F, for the purpose of permitting the turning of screw A upon its axis, whilst at the same time positively preventing its having any movement endwise or in the line of its axis.

The spring B is formed with a hole in one end, of just such size and character as to permit the screw-part of A to enter it, and yet confine the screw positively between its threads, so that it is not possible to shift its position thereon to vary its degree of pressure upon the thread, except by turning the screw.

The screw itself, when turned for this purpose, neither advances nor retreats, but occupies constantly the same position, so that its head cannot ever project beyond the outer surface of the shell of the shuttle, and so catch and break the loop of the needle-thread; nor can it, on the other hand, sink (when turned) beneath such surface, and so be difficult to reach and be worked by the screw-driver.

Figure 1:
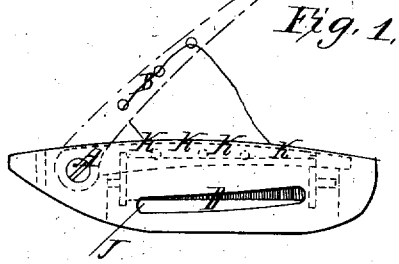
Figure 1 represents a top view of the shuttle as it lies in the machine, with the head only of the adjusting-screw exposed to view, and with the tension-spring B elevated.
Figure 2:
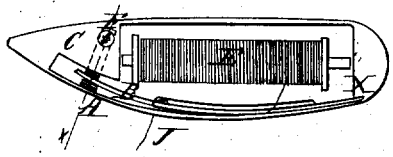
Figure 2 represents the interior of the shuttle.
Figure 3:
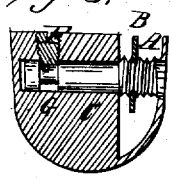
Figure 3 is a cross-section of the shuttle in the line *x x* of fig. 2, and on an enlarged scale, the spring B and detaining-screw F being also shown in section.

The spring, when in position for working, occupies the position at *k k* in fig. 1, its free end resting in the slot *x*, (see fig. 2.)

D represents the long opening in the side of the shuttle through which the thread J passes from the bobbin E, the course of the thread from the bobbin, and its position between the spring and the side of the shuttle, being shown in red.

The spring B being applied as shown, is therefore perfectly free to be turned up or down upon the screw as its center, as shown in fig. 1, to facilitate the threading or unthreading of the thread through the perforations in its side.

The tension is obtained by pressing the thread between the spring and the inside of the shuttle, the turning of the screw regulating the degree of pressure.

The screw A, it will be observed, is located forward of the center of the shuttle, and toward its tip, contrary to the practice, as heretofore, of placing tension-adjusting devices toward the rear, and generally in the heel. Very material advantages result from this arrangement of a screw, which is to be operated by a screw-driver without taking the shuttle from the race, among which may be named the following:

If the adjusting-screw or tension-regulator be near or toward the heel, then, in most cases, upon stopping the machine and removing that slide most convenient to the operator, which covers the race, it is found that the screw is inaccessible, because it has not emerged from beneath the presser-foot, and the machine must be started again, to drive it out to nearly the farthest point of its forward traverse, or it must be picked or pulled out at much inconvenience and loss of time; but, by my arrangement, it is accessible in any position of the shuttle in the race, after the screw has passed a little in advance of the needle; and whilst the main body of the shuttle is hidden from view or out of reach beneath the presser-foot and the rear slide.

Again, the needle-arm, presser-bar, and presser-foot are much in the way, and render it very inconvenient, unless the shuttle be very far forward, to use an ordinary screw-driver, whilst holding the same in a vertical position to operate a screw placed near the heel of the shuttle; but with my screw none but an ordinary screw-driver is ever required, because, the screw being located toward the shuttle-tip, the above-named parts of the machine are not in the way, and the location of the screw upon the slope of the tip allows the operator to work his screw driver in an inclined position.

Again, the location of the screw upon the inclination of the forward end allows of its adjustment even whilst partially under the presser-foot, as a space is thus afforded for the screw-driver to be applied and operated.

And, further, in shuttles wherein the adjusting-screw advances and recedes, its head must not, even when turned outward to its farthest extreme, project a particle beyond the exterior surface of the shuttle; therefore, when screwed inward, it sinks or becomes buried too far to be operated, except by a screw-driver held in a strictly vertical position; hence the great advantage of placing it in the inclined part, and, as my screw never advances so as to sink its head farther and farther within the shuttle, the same common screw-driver is suitable at all times.

Whilst the advantages of placing the screw forward of the center, instead of at its rear, are thus evident, I deem it most advantageous to locate it upon the incline, as I have shown.

Another advantage resulting from locating the hole and the adjusting-screw in the forward end of the shuttle, instead of at the rear, is that the forward end is what is practically (and so known and called) the waste end of the shuttle, that is, the end which can never be occupied by the bobbin, because the pointed or tapering shape of the shuttle forbids the reception and free revolution of the bobbin-heads.

When, on the contrary, the tension-hole and screw are located near the heel, they occupy valuable space, shorten proportionately the bobbin, and lessen its capacity for holding a liberal supply of thread.

What I claim, and desire to secure by Letters Patent, is—

A shuttle having a tension-regulator, substantially as described, having no endwise motion, and actuating a thread-brake against the upper wall of the shuttle, as it lies in the machine ready for use, such regulator being so located as to be accessible and operated from the upper side of the shuttle.

Also, in a sewing-machine shuttle, adapted for having the tension of its thread adjusted through an opening in its upper side, the screw-threaded spindle A having no endwise movement, the thread of which actuates and controls the pressure of a spring thread-brake, substantially as described.

Also, the combination, with a shuttle, of the grooved and threaded spindle A and its detaining-screw F and spring B, arranged and applied substantially as shown and described, and so that the screw-stock shall neither advance nor recede during its revolution.

Also, the combination, substantially as described, of a swinging tension-spring, B, with a fulcrum which is a screw-thread, so that the fulcrumed end shall be positively confined between the threads of the screw, and be free to turn thereon, while the adjustment of the screw shall vary the pressure of the free end of the spring against the wall of the shuttle.

JAMES C. WADE.

Witnesses:
C. WARREN BROWN,
L. H. LATIMER.